(12) United States Patent
Kolb et al.

(10) Patent No.: US 6,250,929 B1
(45) Date of Patent: Jun. 26, 2001

(54) METHODS FOR IMPROVING THE EFFECTIVENESS OF TOILET TRAINING

(75) Inventors: Thomas Mathias Kolb, Appleton; Timothy Russell Schum, West Allis; James Andrew Walter, Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/349,531

(22) Filed: Jul. 8, 1999

Related U.S. Application Data

(60) Provisional application No. 60/132,022, filed on Apr. 30, 1999.

(51) Int. Cl.[7] .................................................. G09B 19/18
(52) U.S. Cl. ........................ 434/238; 236/258; 236/428; 236/430; 4/661
(58) Field of Search ..................... 434/258, 238, 434/236, 428, 430; 4/661

(56) References Cited

U.S. PATENT DOCUMENTS

| | | | |
|---|---|---|---|
| D. 308,989 | * 7/1990 | Cohen | D20/39 |
| D. 316,278 | * 4/1991 | Cohen | D20/39 X |
| D. 330,225 | * 10/1992 | Cohen | D20/42 |
| D. 341,853 | * 11/1993 | Cohen | D20/42 X |
| 4,044,405 | 8/1977 | Kreiss . | |
| 4,384,855 | * 5/1983 | Walsh | 434/238 X |
| 4,744,113 | 5/1988 | Kogut . | |
| 5,117,515 | 6/1992 | White, Jr. et al. . | |
| 5,285,540 | 2/1994 | Putz . | |
| 5,560,051 | 10/1996 | Butts . | |
| 5,690,495 | * 11/1997 | Collier | 434/258 X |
| 5,725,382 | 3/1998 | Walter et al. . | |
| 5,810,395 | * 9/1998 | Morgan | 283/70 X |
| 5,829,073 | * 11/1998 | Lee | 4/661 X |
| 5,865,322 | 2/1999 | Miller . | |

OTHER PUBLICATIONS

Hauck, Mary Rundahl, Ph.D., "Factors Influencing Toileting Behaviors in Toddlers," The University of Wisconsin—Milwaukee, 1988, UMI Dissertation Services, Order Number 8916003.

* cited by examiner

Primary Examiner—Valencia Martin-Wallace
Assistant Examiner—Chanda Harris
(74) Attorney, Agent, or Firm—Thomas M. Gage

(57) ABSTRACT

A method for improving the effectiveness of a child's toilet training regime utilizes a progress scale to evaluate the child's current level or stage of toilet training. Recommendations for improving the effectiveness of the child's training regime are divided into a plurality of unique groups corresponding to a plurality of stages of toilet training. The child's toilet training progress value, determined using the progress scale, is matched to a particular stage of training and the unique group of recommendations corresponding to the child's stage of training are selected. Methods for comparing the effectiveness of various toilet training regimes are also disclosed.

37 Claims, 1 Drawing Sheet

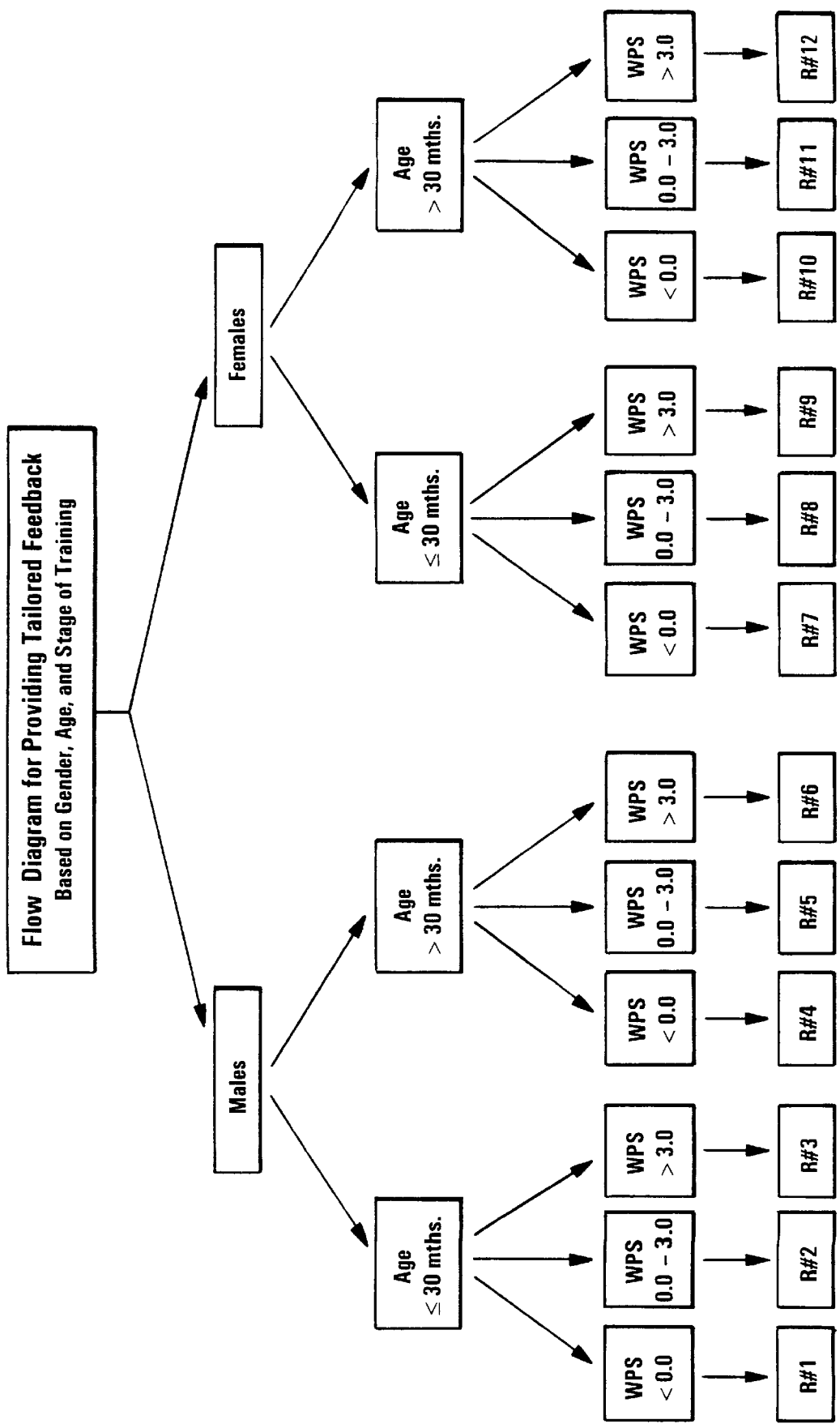

METHODS FOR IMPROVING THE EFFECTIVENESS OF TOILET TRAINING

This application claims Benefit of Provisional Application Ser. No. 60/132,022 filed Apr. 30, 1999.

FIELD OF THE INVENTION

The present invention relates to methods for improving the effectiveness of toilet training. More particularly, the present invention pertains to methods utilizing a progress scale for improving the effectiveness of a child's toilet training regime and for comparing the effectiveness of various toilet training regimes.

BACKGROUND OF THE INVENTION

Little boys and girls normally wear diapers until they are ready for the toilet training process, when they learn to use the toilet by themselves. The point at which a child will begin this training process is dependent upon many factors, some of which are psychological, some physiological, and some unique to the individual child or their environment.

The toilet training process has been studied and found to encompass multiple stages, ranging from early stages of training characterized by behaviors such as understanding potty words to late stages of training characterized by behaviors such as using a regular toilet without a potty seat. As part of the toilet training process, the parent or caregiver desirably provides instruction and positive encouragement and/or reinforcement that the child should now be using a toilet, instead of diapers. The use of training pants is desirable at some point in the process because it represents a change from diapers to the way that grownups dress and use the toilet.

The toilet training process is complicated by the fact that the successes that a child achieves at any particular stage may also depend upon many factors. These too can by psychological, physiological, or related to the individual child or their environment. Unfortunately, if the child does not respond to an initial toilet training instruction or introduction, the parent or caregiver can be at a loss for identifying more suitable products, training aids or techniques.

Parents and caregivers often have difficulty recognizing different stages of toilet training, and even more difficulty accurately determining the stage that their child is in at a given point in time. Without matching the child's stage of toilet training to the particular products, training aids and techniques that are best suited to that stage, the chances for effective toilet training are diminished.

Therefore, what is lacking and needed in the art is a method for improving the effectiveness of a child's toilet training regime, and concomitantly a method for comparing the effectiveness of various toilet training regimes.

SUMMARY OF THE INVENTION

In response to the above-referenced deficiencies in the art, a method has been developed for improving the effectiveness of a child's toilet training regime. The method utilizes a progress scale to evaluate the child's current level or stage of toilet training. The method also provides feedback in the form of specific toilet training recommendations that are matched to the child's current stage of toilet training.

In one embodiment, for instance, the method comprises the steps of: preparing a toilet training progress scale for assessing the child's toilet training progress at a particular point in time, the progress scale comprising a plurality of questions about learned skills related to toilet training and comprising a response format for each question including a plurality of response values, the response values cumulatively generating a toilet training progress value having a range of possible resulting values; dividing the range of possible resulting values into a plurality of sub-ranges representing a plurality of stages of toilet training; generating a plurality of recommendations for improving the effectiveness of the child's toilet training regime; dividing the recommendations into a plurality of unique groups corresponding to the plurality of stages of toilet training; assessing the child's toilet training progress using the toilet training progress scale, including calculating a toilet training progress value for the child; matching the child's toilet training progress value to one of the sub-ranges representing a particular stage of toilet training; selecting the group of recommendations that corresponds to the child's particular stage of toilet training; and outputting the selected group of recommendations.

As used herein, the term "regime" refers to a combination of toilet training garments, toilet training aids and behavioral techniques that are used to effect toilet training. The term "toilet training garments" includes disposable diapers, disposable training pants, cloth training pants and cloth underwear.

The term "toilet training aids" includes: potty training story books for children; potty training guide books for parents; potty training videotapes for children; progress charts with stickers; stickers alone as rewards; potty training dolls; miniature toilets; potty training flash cards; potty training tip sheets; potty training brochures and pamphlets; reward items, such as stickers, crayons, candy, toys or the like; urine targets; potty training diplomas; starter kits containing a combination of these items; potty chairs; musical potty chairs; wetness awareness devices, such as musical alarms, "feel wet" liners, or the like; and toilet paper with children's graphics.

The term "behavioral techniques" includes demonstrating how you use the toilet; reminding the child to use the potty; limiting or keeping track of child's intake of fluids; running water while child is seated; praising for toileting progress; providing cloth training pants; providing disposable training pants; providing potty seat/chair; letting child decide when to go; not allowing diapers once started training; giving rewards for success; firm and consistent approach; verbal teaching and explanation of toilet training; dressing the child in few/no clothes; disciplining the child; providing children's underwear/panties; placing on potty/toilet at certain intervals; monitoring child's behavior; having your child sit on the potty for a specified time period; using older children as role models (home or daycare); encouraging your child to be a "Big Kid;" and using toilet training videos and books to motivate your child.

The toilet training progress scale is used to assess a child's toilet training progress at a particular point in time, and may be used at different points in time to measure improvement and/or regression during the toilet training process. In a preferred embodiment, the progress scale comprises a series of questions about learned skills related to toilet training. A parent or caregiver, hereinafter simply referred to as a caregiver, responds to specific questions about the child's toilet training progress. The questions about learned skills may concern, for example, the frequency and location of urination or bowel movements (BM), use of the bathroom, understanding of toilet training terms, activities handled independently by the child, and communications from the child about the need to use the bathroom.

Each question includes a response format having a plurality of response values, such as "yes" or "no." The response values may be textual in nature but are desirably assigned a numerical value, such as 1 for "yes" and 0 for "no." Desirably, the response format or each question includes 3 or more response values, particularly 4 or more response values, and more particularly 5 or more response values. An example of a response format with 3 response values is "never," "sometimes," and "always," which may be assigned numerical values of −1, 0 and 1;0, 1 and 2; 0, 3 and 5; or the like. Including a greater number of response values allows the strength of response to be measured, for example with qualitative questions such as whether your child knows how to urinate in the potty, and allows a wider number of frequencies to be measured, such as with quantitative questions such as how many times per day does your child sit on the toilet.

The result of the progress scale is a "toilet training progress value" that represents the cumulative value of each of the question response values. The toilet training progress value may consist simply of the sum or the average of the individual question response values. More desirably, the response values are differentially weighted depending upon the significance of the relationship between toilet training and the subject of the question. The differentially weighted response values may then be added together or averaged in order to generate the toilet training progress value. As used herein, the terms "cumulative" and "cumulatively" refer to combining the question response values to obtain the toilet training progress value; they are not limited to a specific mathematical approach for combining the response values.

The toilet training progress value represents a concrete and tangible result that can be used for several useful outcomes, including: evaluating the present stage of toilet training; comparing the effectiveness of two or more different toilet training methods; assessing the performance of different toilet training aids; and guiding feedback to caregivers for assisting in the toilet training process, including tips and techniques that are likely to be effective at that stage.

The range of possible resulting values using the progress scale can be divided into a plurality of sub-ranges that represent various stages of toilet training. By way of illustration, the lowest third of the range of possible resulting values may represent the early stages of toilet training, the highest third of the range of possible resulting values may represent the later or final stages of toilet training, and the middle third of the range of possible resulting values may represent the intermediate stages of toilet training. Alternatively, a greater number of sub-ranges may be used to represent a greater number of stages of toilet training.

A particularly beneficial aspect of the present invention is that a child's toilet training status can be determined using the progress scale for the purpose of providing appropriate tips and guidance on toilet training. As a child progresses through toilet training, a caregiver faces different issues. For example, very early in the process just determining if the child is ready to begin training is of primary importance. Later in the process, issues such as, the child being aware of accidents or learning to let the caregiver know before having an accident are bigger concerns.

By using the progress scale to first assess exactly how far the child has progressed in training, tailored guidance can be dispensed to each caregiver individually. In particular, a variety of recommendations pertaining to toilet training may be divided into unique groups that are particularly appropriate for the enumerated stages of toilet training. The recommendations may additionally be divided into groups taking into consideration the age and gender of the child. The groups may have some common recommendations, but desirably the groups will include recommendations that are specific to the targeted stage of training. Although less desirable, where the recommendations are divided into a large number of groups, a minor percentage of the groups can be identical to one another.

For purposes of the present invention, recommendations related to toilet training that might be provided to a caregiver are divided into three categories: information on toilet training garments and toilet training aids, information on training tips, and typical child behaviors to monitor. In one scenario, for example, a caregiver completes the survey and the score indicates that the child is just getting started with toilet training. The following points might be woven into a feedback message.

If you haven't yet purchased a potty chair, allow your child to help pick one out at the store. Making your child part of the process helps your child get excited about starting training. (Tips/Guidance for Early Stage)

Introduce disposable training pants. Make a big deal out of them. Explain to your child that these are "Big Kid" pants and Big Kids use the potty. (Training Garments for Early Stage)

In another scenario, a caregiver completes the progress survey and the score indicates that the child is about half complete with toilet training. The following points might be provided as a feedback message.

Don't be surprised if your child always says "no" when you ask if they need to use the potty. Avoid this standoff by getting your child in a routine of using the potty at regular intervals. Don't ask them if they need to go, just tell them it's time to use the potty. If you want, use an egg timer as a reminder so that the child doesn't blame you for the interruption of play that will happen when it's time to go. (Typical behavior/issue and Tip/Guidance for Middle Stage)

Children at your child's age and stage may lose interest in training after only a week or two. If this happens, you can try to regain their interest by making sitting on the potty part of a fun, made-up game. If you're using rewards, changing the reward at this point may also help. If these or similar activities don't get your child's attention back, take a break from training. Come back to it in a month or two. (Typical behavior/issue and Tip/Guidance for Middle Stage)

The present method is particularly suited for use by a caregiver over an electronic communication medium, such as an interactive web-site accessible via the internet. The progress scale may be incorporated, by way of illustration, into a web page that provides instruction and guidance pertaining to toilet training. In particular embodiments, therefore, the method also comprises the steps of: storing the toilet training progress scale on an electronic storage medium; storing the recommendations for improving the effectiveness of the child's toilet training regime on an electronic storage medium; providing a user of an electronic communication medium with access to the progress scale; transmitting data representing response values to a processor; providing instructions to the processor to calculate a toilet training progress value from the transmitted data and select the group of recommendations that corresponds to the child's particular stage of toilet training; and outputting the selected group of recommendations to the user via the electronic communication medium. A computer accessible via the internet could provide the necessary processor and storage medium to carry out this method. Alternatively, a caregiver could complete the progress scale and obtain targeted recommendations using a telephone system.

As can be appreciated, computers and electronic communication media such as the internet are particularly suited to transforming data from the progress scale, representing psychological aspects of a child and physiological development stages of a child, through a series of mathematical calculations into a toilet training progress value. This value can then be used in combination with other parameters, such as the age and gender of the child, to provide tailored recommendations for toilet training.

Another method for improving the effectiveness of a child's toilet training regime measures changes in the toilet training progress value over time and selects particular toilet training recommendations suited for the stage of toilet training and the amount of improvement over time.

Thus, in one embodiment, the method comprises the steps of: assessing the child's toilet training progress at an initial point in time using a toilet training progress scale, the progress scale comprising a plurality of questions about learned skills related to toilet training; calculating a first toilet training progress value for the initial point in time; assessing the child's toilet training progress at a subsequent point in time using the progress scale, the subsequent point in time about four days or more after the initial point in time; calculating a second toilet training progress value for the subsequent point in time; comparing the first and second toilet training progress values to obtain a progress indicator; generating a plurality of recommendations for improving the effectiveness of the child's toilet training regime; dividing the recommendations into a plurality of unique groups corresponding to a plurality of stages of toilet training; selecting one of the groups of recommendations based on the value of one of the toilet training progress values and the value of the progress indicator; and outputting the selected group of recommendations.

The progress indicator may comprise, for example, the difference between the first and second toilet training progress values. The magnitude of the difference may then be used to select the appropriate group of toilet training recommendations for the child. When the progress indicator reveals that the child has not improved or has regressed in training, the appropriate group of recommendations might include changing a reward, using an older sibling as a role model, or even terminating training for a while.

This method also embodies the concept that the suitableness of the recommendations will depend in part on the stage of training of the child. In addition to selecting an appropriate group of recommendations based on the value of the progress indicator, the stage of training again should be considered. For example, a different group of recommendations would be warranted for a child at the early stages of training compared to the late stages of training, even when the value of the progress indicator is the same. The method could use either one of the first or second toilet training progress values.

The methods of the present invention can also be used to compare the effectiveness of two or more toilet training regimes. For instance, the progress scale can be used as a measurement tool for assessing the efficacy of training aid improvements. Test protocols can be implemented to compare a test population using a training pant with potentially enhanced training features to a control population using only conventional training pants. By measuring the training status of both groups before and after use, one can statistically determine if the test population has made significantly more progress than the control population.

One embodiment of a method for comparing the effectiveness of two or more toilet training regimes comprises the steps of: selecting a first set of children to use a first toilet training regime; assessing the toilet training progress of the first set of children at an initial point in time using a toilet training progress scale, the progress scale comprising a plurality of questions about learned skills related to toilet training and comprising a response format for each question consisting of a plurality of response values, the response values cumulatively generating a toilet training progress value; selecting a comparable second set of children to use a second toilet training regime different than the first toilet training regime; assessing the toilet training progress of the second set of children at an initial point in time using the progress scale; assessing the toilet training progress of the first set of children at a subsequent point in time using the progress scale, the subsequent point in time about four days or more after the initial point in time and after initiation of the first toilet training regime; assessing the toilet training progress of the second set of children at a subsequent point in time using the progress scale, the subsequent point in time about four days or more after the initial point in time and after initiation of the second toilet training regime; and comparing the relative change in toilet training progress values of the first set of children from the initial point in time to the subsequent point in time to those of the second set of children from the initial point in time to the subsequent point in time, whereby the greater relative change in group toilet training progress values indicates the more effective toilet training regime.

A wide variety of techniques may be used to compare the relative change in toilet training progress value for the two sets of children. For instance, the difference in initial and subsequent progress values may be determined for each child, and the individual degrees of improvement grouped for comparison. Alternatively, the method may comprise: calculating beginning group toilet training progress values for both sets of children at the initial points in time; calculating final group toilet training progress values for both sets of children at the subsequent points in time; and comparing the relative change in beginning and final group toilet training progress values. Each group toilet training progress value may constitute an aggregate or average of the individual child toilet training progress values from within the set of children. Alternatively, the group toilet training progress value may constitute the percentage of children that made progress, or another suitable statistic.

Suitable comparable sets of children would be those that as a group have similar age and gender characteristics and/or are at similar stages of toilet training. In certain circumstances it may be desirable to have all children that are just starting training. In other circumstances it may be desirable to have an equal number of children distributed throughout the stages of training.

The effectiveness of different toilet training regimes is best compared when the different regimes are used by children at similar stages of toilet training. The progress scale can be used to classify a group of children into various stages of toilet training and select a set of children from the group that are at the same or similar stages of toilet training.

Hence, one method for comparing the effectiveness of different toilet training regimes comprises the steps of: preparing a toilet training progress scale for assessing a child's toilet training progress, the progress scale comprising a plurality of questions about learned skills related to toilet training and comprising a response format for each question including a plurality of response values, the response values cumulatively generating a toilet training progress value having a range of possible resulting values; dividing the range of possible resulting values into a plurality of sub-ranges representing a plurality of stages of toilet training; selecting a group of children; assessing the toilet training progress of the children within the group using the toilet training progress scale; selecting one of the sub-ranges representing one of the stages of toilet training; selecting a set of children from the group that have toilet training progress values within the selected sub-range; and dividing the set of children into a first panel and a second panel for evaluating different toilet training regimes.

Thereinafter, the toilet training progress of the first panel may be assessed after using a first toilet training regime for a period of time, and the toilet training progress of the second panel may be assessed after using a second toilet training regime for a comparable period of time. The relative improvement in progress values of the first and second panels will be indicative of the effectiveness of the different regimes, at least for children at the particular stage of toilet training being tested.

The regimes may employ different garments, such as cloth training pants or disposable absorbent training pants, different training aids, different behavioral techniques, or various combinations thereof. The period of time between assessments will depend in part on the nature of the regimes being tested, although the period is suitably about four days for more, and particularly about one week or more.

It may also be desirable for the first and second panels of children to have similar age and gender characteristics. Thus, the panels may be selected so that there are an equal number of children in each of several age categories, for example, 18–27 months, 28–36 months, and 37–48 months. Also, the panels may be selected so that the ratio of male to female children in the first and second panels is substantially the same, such as within about 10 percent, and more particularly within about 5 percent.

An alternative method for comparing the effectiveness of different toilet training regimes comprises the steps of: preparing a toilet training progress scale for assessing a child's toilet training progress, the progress scale comprising a plurality of questions about learned skills related to toilet training and comprising a response format for each question including a plurality of response values, the response values cumulatively generating a toilet training progress value having a range of possible resulting values; dividing the range of possible resulting values into a plurality of sub-ranges representing a plurality of stages of toilet training; selecting a group of children; assessing the toilet training progress of the children within the group using the toilet training progress scale; dividing the group of children into a first panel and a second panel for evaluating different toilet training regimes, the first panel having a group toilet training progress value that is substantially the same as a group toilet training progress value for the second panel.

Numerous additional features and advantages of the present invention will appear from the following description. In the description, reference is made to the accompanying drawing which illustrates one embodiment for providing tailored feedback based on the gender, age and stage of toilet training of a child. Such embodiment does not represent the full scope of the invention. Reference should therefore be made to the claims herein for interpreting the full scope of the invention.

DETAILED DESCRIPTION OF PARTICULAR EMBODIMENTS

In one particular embodiment, the toilet training progress scale comprises a Weighted Progress Scale (WPS), which is a tool specifically designed to objectively measure a child's toilet training progress. One particular WPS was developed using a database of information collected during a 2-year longitudinal study conducted in cooperation with the Medical College of Wisconsin. The database contains a wealth of information on all the individual behaviors that children must learn on the way to becoming toilet trained. This was accomplished by designing a survey specifically for this purpose. The survey, which was completed weekly during the study by the child's mother, collected data on 32 separate toileting behaviors. Four (4) of the items were measures of daily successful use of the potty chair or toilet. The items were rated using either a 4 or 5 point scale corresponding to the number of times, on average, the child was doing each behavior on a daily basis. The other 28 items assessed a complete array of behaviors associated with learning to use the bathroom successfully. How often the child performed each of these behaviors was rated by the mother using a 1–5 rating scale with 1 representing "never" and 5 representing "always." Data was collected for up to 16 months on 265 children as they progressed from a pre-training stage through toilet training to a stage of toileting independence.

The measures of daily success used in the WPS are listed below. The first three of these questions had a response format with five response values (0, 1–2, 3–5, 6–8, and 9+), and the fourth question had a response format with four response values (0, 1, 2, and 3+).

ON AVERAGE, HOW MANY TIMES A DAY DID YOUR CHILD . . .

1) Urinate (pee) or have a BM (poop) in their pants/diapers?

2) Sit on the toilet or potty seat/chair?

3) Urinate (pee) in the toilet or potty chair?

4) Have a BM (poop) in the toilet or potty chair?

The other 28 WPS questions are listed below. All of these questions had a response format with five response values (1, 2, 3, 4, and 5), where response value 1 was coded "Never," response value 3 was coded "Sometimes," and response value 5 was coded "Always."

SELECT A RESPONSE VALUE CORRESPONDING TO LEVEL YOUR CHILD IS AT THIS WEEK:

1) Stays dry for over two (2) hours

2) Has regular bowel movements (approximately same time daily)

3) Has a potty chair or potty seat available (in addition to a toilet)

4) Understands potty words (like pee, wee wee, BM, potty, etc.)

5) Indicates a physical need to go potty by wiggling, pausing, hiding, etc.

6) Wears a training pant or underwear

7) Sits on the potty when placed (for 5 minutes)

8) Shows an interest in using the potty by talking, pointing, watching

9) Tells you during or after a urine (pee) accident

10) Tells you during or after a bowel movement (BM, poop)

11) Pulls training pants or underwear up by him/herself

12) Pulls training pants or underwear down by him/herself

13) Urinates in the potty with your help
14) Flushes toilet by him/herself
15) Wipes urine (pee) effectively by herself (GIRLS ONLY)
16) Urinates (pees) while standing by himself (BOYS ONLY)
17) Wipes BM (poop) effectively by him/herself
18) Washes hands by him/herself
19) Tells you before having a bowel movement (poop)
20) Tells you before having to urinate (pee)
21) Knows how to urinate (pee) in the potty
22) Enters bathroom and urinates (pees) in the potty by him/herself
23) Enters bathroom and has a BM (poop) in the potty by him/herself
24) Stays dry during the day
25) Stays BM (poop) free during the day
26) Wakes up BM (poop) free overnight
27) Wakes up dry overnight
28) Uses the regular toilet without potty seat With two exceptions, the questions in this grouping relate to learned skills related to toilet training. Question number 3 concerns the availability of toilet training equipment. Question number 6 concerns the caregiver's choice of training garment.

Once the database was complete, the ratings for each item were analyzed to determine if they showed a significant linear correlation with toilet training progress. Thirty-one (31) of the 32 items proved to show such a correlation. Question number 2 pertaining to having regular bowel movements did not show a significant correlation. Only the remaining 31 items were used in subsequent analysis. A statistical procedure called Canonical Discriminant Analysis was then used to cluster the surveys into 3 groups corresponding to a continuum from the early, middle and late stages of training. Male and female data had to be analyzed separately because one behavior on the survey pertained only to boys and another pertained only to girls. The gender-specific behavior for boys was standing while urinating. The behavior for girls was wiping urine effectively by themselves.

The result of the Canonical Discriminant Analysis was two sets of coefficients (one for boys and another for girls) that essentially weights each question based on it's ability to predict how far a child has progressed in training. The product of the coefficient and the corresponding rating is the contribution of that item to the child's overall score. The sum of all 30 items plus an arbitrary constant yields a child's total WPS. The constant was added so the median value of the scale would be approximately zero. The resulting equation is of the form:

$$WPS = \text{constant} + \text{coeff}_1(\text{rating item 1}) + \text{coeff}_2(\text{rating item 2}) + \ldots + \text{coeff}_{30}(\text{rating item 30})$$

In this particular study, the resulting equations for girls and boys were:

$WPS_{Girls}$=(−7.451039547)+(0.128152172) (rating item 1)+(0.041971246) (rating item 2)+(0.239076402) (rating item 3)+(0.145284682) (rating item 4)+(−0.001671888) (rating item 5)+(0.038417748) (rating item 6)+(−0.060396761) (rating item 7)+(0.020772648) (rating item 8)+(0.246372924) (rating item 9)+(−0.004745736) (rating item 10)+(0.061745678) (rating item 11)+(0.060004417) (rating item 12)+(0.017147363) (rating item 13)+(0.060518663) (rating item 14)+(0.302706042) (rating item 15)+(0.048527553) (rating item 16)+(0.103962941) (rating item 17)+(0.09893343) (rating item 18)+(0) (rating item 19)+(0.014404783) (rating item 20)+(0.162216406) (rating item 21)+(0.073733072) (rating item 22)+(0.181284268) (rating item 23)+(0.163142281) (rating item 24)+(0.16158228) (rating item 25)+(0.097555822) (rating item 26)+(0.37625208) (rating item 27)+(0.125265405) (rating item 28)+(0.003272056) (rating item 29)+(0.083625853) (rating item 30)+(0.065309514) (rating item 31).

$WPS_{Boys}$=(−6.951455)+(0.084994649) (rating item 1)+(−0.04725484) (rating item 2)+(0.182468882) (rating item 3)+(0.289820732) (rating item 4)+(0.086541745) (rating item 5)+(0.033689299) (rating item 6)+(−0.01672961) (rating item 7)+(0.017864443) (rating item 8)+(0.160919483) (rating item 9)+(0.08221516) (rating item 10)+(0.11073007) (rating item 11)+(0.089483695) (rating item 12)+(0.006554928) (rating item 13)+(0.04290046) (rating item 14)+(0.242002886) (rating item 15)+(0.049427276) (rating item 16)+(0.03412295) (rating item 17)+(0) (rating item 18)+(0.090071031) (rating item 19)+(−0.14351426) (rating item 20)+(0.056435169) (rating item 21)+(0.132503394) (rating item 22)+(0.120012498) (rating item 23)+(0.393357222) (rating item 24)+(0.192515585) (rating item 25)+(0.164606049) (rating item 26)+(0.186182297) (rating item 27)+(0.050362164) (rating item 28)+(−0.02472152) (rating item 29)+(0.032205617) (rating item 30)+(0.246386367) (rating item 31).

For the particular WPS referenced herein, the scale ranged from −4.1 to +7.5. A large negative score corresponds to very little progression in toilet training. A large positive score corresponds a great deal of progress or completion of toilet training. In the above equations, rating items 1–4 correspond to the four WPS questions quantifying daily behaviors, and rating items 5–31 correspond to the remaining 28 WPS questions but excluding question number 2, as discussed above.

The progress scale can be used to provide the caregiver with individualized feedback for the child. With reference to the figure, the feedback is in the form of recommendations for improving the effectiveness of the child's toilet training regime. In the illustrated embodiment, the recommendations have been divided into twelve unique groups labeled R#1 through R#12. These groups correspond to three stages of toilet training denoted by toilet training progress values (WPS values) of less than 0, from 0 to 3, and greater than 3. The illustrated flow diagram for providing feedback also tailors the feedback based on the gender and age of the child. Specifically, feedback groupings R#1 through R#3 are for males less than or equal to 30 months old, groupings R#4 through R#6 are for males over 30 months old, groupings R#7 through R#9 are for females less than or equal to 30 months old, and groupings R#10 through R#12 are for females over 30 months old. A wide variety of alternatives for dividing the recommendations into unique groups is possible.

EXAMPLES

The following Example is provided to give a more detailed understanding of the invention. The particular amounts, compositions and parameters are meant to be exemplary, and are not intended to specifically limit the scope of the invention.

Two groups of children were recruited to participate in a toilet training study. Each group contained approximately 80 children. The two groups were matched so that each contained the same number of children in each of three stages:

early stage trainers, middle stage trainers, and late stage trainers. The children were categorized into these stages using an abridged version of the Weighted Progress Scale (WPS). The abridged version used only the three questions with the highest correlation with toilet training progress, namely questions 20, 21 and 23. Furthermore, each group contained a 50:50 split of boys and girls. One of the groups, the experimental group, was given disposable training pants with a water-soluble graphic that disappeared when the child wet in the pant. The graphic feature was intended to gently make both the mother and child aware of an accident. The other group, the control group, was given traditional disposable training pants without the graphic feature. The two groups were given the WPS prior to beginning the study and once a week thereafter for a total of eight (8) weeks. The average week-by-week progress for the two groups was compared using standard statistical techniques.

The foregoing detailed description has been for the purpose of illustration. Thus, a number of modifications and changes may be made without departing from the spirit and scope of the present invention. For instance, alternative or optional features described as part of one embodiment can be used to yield another embodiment. Additionally, two named components could represent portions of the same structure. Therefore, the invention should not be limited by the specific embodiments described, but only by the claims.

We claim:

1. A method for improving the effectiveness of a child's toilet training regime, comprising:
    preparing a toilet training progress scale for assessing the child's toilet training progress at a particular point in time, the progress scale comprising a plurality of questions about learned skills related to toilet training and comprising a response format for each question including a plurality of response values, the response values cumulatively generating a toilet training progress value having a range of possible resulting values;
    dividing the range of possible resulting values into a plurality of sub-ranges representing a plurality of stages of toilet training;
    generating a plurality of recommendations for improving the effectiveness of the child's toilet training regime;
    dividing the recommendations into a plurality of unique groups corresponding to the plurality of stages of toilet training;
    assessing the child's toilet training progress using the toilet training progress scale, including calculating a toilet training progress value for the child;
    matching the child's toilet training progress value to one of the sub-ranges representing a particular stage of toilet training;
    selecting the group of recommendations that corresponds to the child's particular stage of toilet training; and
    outputting the selected group of recommendations.

2. The method of claim 1, wherein the recommendations are divided into a plurality of unique groups also based on the age of the child.

3. The method of claim 1, wherein the recommendations are divided into a plurality of unique groups also based on the gender of the child.

4. The method of claim 1, wherein the recommendations are divided into a plurality of unique groups also based on the age and gender of the child.

5. The method of claim 1, wherein the recommendations pertain to disposable absorbent articles.

6. The method of claim 1, wherein the recommendations pertain to training aids.

7. The method of claim 1, wherein the response values are differentially weighted and summed to generate the toilet training progress value.

8. The method of claim 1, further comprising:
    storing the toilet training progress scale on an electronic storage medium;
    storing the recommendations for improving the effectiveness of the child's toilet training regime on an electronic storage medium;
    providing a user of an electronic communication medium with access to the progress scale;
    transmitting data representing response values to a processor;
    providing instructions to the processor to calculate a toilet training progress value from the transmitted data and select the group of recommendations that corresponds to the child's particular stage of toilet training; and
    outputting the selected group of recommendations to the user via the electronic communication medium.

9. The method of claim 8, wherein the electronic communication medium is the internet.

10. A method for improving the effectiveness of a child's toilet training regime, comprising:
    assessing the child's toilet training progress at an initial point in time using a toilet training progress scale, the progress scale comprising a plurality of questions about learned skills related to toilet training;
    calculating a first toilet training progress value for the initial point in time;
    assessing the child's toilet training progress at a subsequent point in time using the progress scale, the subsequent point in time about four days or more after the initial point in time;
    calculating a second toilet training progress value for the subsequent point in time;
    comparing the first and second toilet training progress values to obtain a progress indicator;
    generating a plurality of recommendations for improving the effectiveness of the child's toilet training regime;
    dividing the recommendations into a plurality of unique groups corresponding to a plurality of stages of toilet training;
    selecting one of the groups of recommendations based on the value of one of the toilet training progress values and the value of the progress indicator; and
    outputting the selected group of recommendations.

11. The method of claim 10, wherein the progress scale further comprises a response format for each question including a plurality of response values, the response values cumulatively generating the toilet training progress value.

12. The method of claim 10, wherein the response values are differentially weighted and summed to generate the toilet training progress value.

13. The method of claim 10, wherein the group of recommendations is selected based on the magnitude of the difference between the first and second toilet training progress values.

14. A method for comparing the effectiveness of two or more toilet training regimes, comprising:
    selecting a first set of children to use a first toilet training regime;
    assessing the toilet training progress of the first set of children at an initial point in time using a toilet training progress scale, the progress scale comprising a plurality of questions about learned skills related to toilet training and comprising a response format for each question consisting of a plurality of response values, the response values cumulatively generating a toilet training progress value;

selecting a comparable second set of children to use a second toilet training regime different than the first toilet training regime;

assessing the toilet training progress of the second set of children at an initial point in time using the progress scale;

assessing the toilet training progress of the first set of children at a subsequent point in time using the progress scale, the subsequent point in time about four days or more after the initial point in time and after initiation of the first toilet training regime;

assessing the toilet training progress of the second set of children at a subsequent point in time using the progress scale, the subsequent point in time about four days or more after the initial point in time and after initiation of the second toilet training regime; and comparing the relative change in toilet training progress values of the first set of children from the initial point in time to the subsequent point in time to those of the second set of children from the initial point in time to the subsequent point in time, whereby the greater relative change in toilet training progress values between the sets of children indicates the more effective toilet training regime.

15. The method of claim 14, further comprising:

calculating beginning group toilet training progress values for both sets of children at the initial points in time;

calculating final group toilet training progress values for both sets of children at the subsequent points in time; and comparing the relative change in beginning and final group toilet training progress values.

16. The method of claim 15, wherein the group toilet training progress values comprise aggregate values for the sets of children.

17. The method of claim 15, wherein the group toilet training progress values comprise average values for the sets of children.

18. The method of claim 14, wherein the response values are differentially weighted and summed to generate the toilet training progress value.

19. The method of claim 14, wherein the first and second toilet training regimes employ different disposable absorbent articles.

20. The method of claim 14, wherein the first and second toilet training regimes employ different toilet training aids.

21. The method of claim 14, wherein the step of comparing the relative change in toilet training progress values comprises determining for each set the number or percentage of children whose subsequent toilet training progress value is greater than their initial toilet training progress value.

22. The method of claim 14, wherein the first and second toilet training regimes employ different behavioral techniques.

23. A method for comparing the effectiveness of different toilet training regimes, comprising:

preparing a toilet training progress scale for assessing a child's toilet training progress, the progress scale comprising a plurality of questions about learned skills related to toilet training and comprising a response format for each question including a plurality of response values, the response values cumulatively generating a toilet training progress value having a range of possible resulting values;

dividing the range of possible resulting values into a plurality of sub-ranges representing a plurality of stages of toilet training;

selecting a group of children;

assessing the toilet training progress of the children within the group using the toilet training progress scale;

selecting one of the sub-ranges representing one of the stages of toilet training;

selecting a set of children from the group that have toilet training progress values within the selected sub-range; and dividing the set of children into a first panel and a second panel for evaluating different toilet training regimes.

24. The method of claim 23, further comprising:

assessing the toilet training progress of the first panel using the toilet training progress scale after the first panel uses a first toilet training regime for about four days or more; and assessing the toilet training progress of the second panel using the toilet training progress scale after the second panel uses a second toilet training regime for about four days or more.

25. The method of claim 24, further comprising comparing the relative improvement of the first panel to the second panel based on the toilet training progress values of the panel members.

26. The method of claim 24, wherein the first and second toilet training regimes employ different disposable absorbent garments.

27. The method of claim 24 wherein the first and second toilet training regimes employ different toilet training aids.

28. The method of claim 24, wherein the first and second toilet training regimes employ different behavioral techniques.

29. The method of claim 23, wherein the response values are differentially weighted and summed to generate the toilet training progress value.

30. The method of claim 23, wherein the average age of the children in the first and second panels is substantially the same.

31. The method of claim 23, wherein the ratio of male to female children in the first and second panels is substantially the same.

32. A method for comparing the effectiveness of different toilet training regimes, comprising:

preparing a toilet training progress scale for assessing a child's toilet training progress, the progress scale comprising a plurality of questions about learned skills related to toilet training and comprising a response format for each question including a plurality of response values, the response values cumulatively generating a toilet training progress value having a range of possible resulting values;

dividing the range of possible resulting values into a plurality of sub-ranges representing a plurality of stages of toilet training;

selecting a group of children;

assessing the toilet training progress of the children within the group using the toilet training progress scale;

dividing the group of children into a first panel and a second panel for evaluating different toilet training regimes, the first panel having a group toilet training progress value that is substantially the same as a group toilet training progress value for the second panel.

33. The method of claim 32, wherein the average age of the children in the first and second panels is substantially the same.

34. The method of claim 32, wherein the ratio of male to female children in the first and second panels is substantially the same.

35. The method of claim 32, further comprising:
assessing the toilet training progress of the first panel using the toilet training progress scale after the first panel uses a first toilet training regime for about four days or more; and
assessing the toilet training progress of the second panel using the toilet training progress scale after the second panel uses a second toilet training regime for about four days or more.

36. The method of claim 35, further comprising comparing the relative improvement of the first panel to the second panel based on the toilet training progress values of the panel members.

37. The method of claim 32, wherein the response values are differentially weighted and summed to generate the toilet training progress value.

* * * * *